United States Patent
Wahle et al.

[11] Patent Number: 6,021,752
[45] Date of Patent: Feb. 8, 2000

[54] VEHICLE HEATER INDEPENDENT OF THE ENGINE

[75] Inventors: Guido Wahle; Heinrich Wacker, both of Weilheim, Germany

[73] Assignee: J. Eberspächer GmbH & Co., EssLingen, Germany

[21] Appl. No.: 09/043,079

[22] PCT Filed: Sep. 3, 1996

[86] PCT No.: PCT/DE96/01676

§ 371 Date: Mar. 6, 1998

§ 102(e) Date: Mar. 6, 1998

[87] PCT Pub. No.: WO97/11856

PCT Pub. Date: Apr. 3, 1997

[30] Foreign Application Priority Data

Sep. 12, 1995 [DE] Germany .......................... 195 33 630

[51] Int. Cl.⁷ .................................................. G05D 23/00
[52] U.S. Cl. .............................. 123/142.5 R; 237/12.3 C
[58] Field of Search .......... 123/142.5 R; 165/DIG. 108, 165/DIG. 18, 240; 237/12.3 C, 12.3 B; 62/324.1

[56] References Cited

U.S. PATENT DOCUMENTS

| | | | |
|---|---|---|---|
| 5,137,445 | 8/1992 | Chu .................................... | 237/12.3 C |
| 5,205,250 | 4/1993 | Easterly et al. ................... | 123/142.5 R |
| 5,350,114 | 9/1994 | Nelson et al. ..................... | 237/12.3 C |
| 5,788,148 | 8/1998 | Burner et al. ..................... | 237/12.3 C |

FOREIGN PATENT DOCUMENTS

| | | |
|---|---|---|
| 0 197 823 A1 | 10/1986 | European Pat. Off. . |
| 44 46 829 A1 | 7/1995 | Germany . |

*Primary Examiner*—Noah P. Kamen
*Assistant Examiner*—Jason Benton
*Attorney, Agent, or Firm*—McGlew and Tuttle, P.C.

[57] ABSTRACT

The invention relates to a vehicle heater which is independent of the engine, has a burner head (9) and a flame tube (8) and is surrounded by a heat exchanger casing (10) through which a heat transfer medium can flow. The heat exchanger casing has connections (A; B) for inflow and outflow of the heat exchanger medium, and regulating sensors (20; 20'; 22) arranged in the region of the connections are connected to a control device which regulates the operation of the vehicle heater in relation to the heat transfer medium temperature measured. The aim of the invention is also to have the alternative of the heat transfer medium being able to flow through the heat exchanger casing (10) in the opposite direction, the connections (A; B) for the inflow and the outflow of the heat transfer medium subsequently being interchanged, and the regulating values of the existing regulating sensors being adapted.

14 Claims, 1 Drawing Sheet

VEHICLE HEATER INDEPENDENT OF THE ENGINE

The present invention pertains to an engine-independent vehicle heater, with a burner head and a flame tube, which is surrounded by a heat exchanger jacket, through which a heat carrier medium flows, wherein the heat exchanger jacket has connections for an inlet and an outlet of the heat exchanger medium, and control sensors, which are connected to a control device that controls the operation of the vehicle heater as a function of the heat carrier temperature measured, are arranged in the area of the connections, and an overheating protection means may also be provided.

A vehicle heater of the above-described type has been known from DE 44 46 829 A1; even though the control device of this vehicle heater makes possible a defined, reliable operation of the heater corresponding to the set points set, the inlet and the outlet of the heat exchanger medium are located at the heat exchanger jacket. Connection lines located there, leading from the vehicle engine, on the one hand, and to the heat exchanger of the interior space of the vehicle, on the other hand, inherently contain auxiliary means, such as a water pump and possibly a bypass line and require a corresponding mounting space in the vehicle. The application and use of such a heater are consequently limited to a certain vehicle model. This is also true because of the fixed arrangement of the control sensors in the device, which make possible only a single, defined operation for an individual vehicle. If, e.g., the design of the prior-art heater is to be simplified and the heat carrier temperature sensor is to be arranged on the outlet side at the beat exchanger jacket, e.g., together with an overheating sensor arranged there, this leads to certain drawbacks in terms of a stable, uniform control operation of the vehicle heat exchanger in the direction of the interior space of the vehicle, because the heater is controlled in this case based on the heat carrier temperature detected at the outlet-side end of the heat exchanger jacket, which is subject to short-term variations, depending on whether the heat user to the interior space of the vehicle is switched on or not (if no bypass line is present).

Based on the known state of the art, the object of the present invention is to provide a vehicle heater of the type described in the introduction, which expands the possibilities of application and use while having a simple design and being reliable in operation.

The basic object of the present invention is accomplished by a heater of the type disclosed in claim 1.

The subject of the present invention is advantageously improved by the features of claims 2 through 8.

Provisions are made according to the present invention for the heat carrier medium also to be able to flow through the heat exchanger jacket in the reversed direction as desired, in which case the connections for the inlet and the outlet of the heat carrier medium are transposed and the control values of the existing control sensors are correspondingly adapted.

The control sensors can now be connected mutually transposed to the control device if the control device has plug-type connections, or the existing control sensors may be mounted mutually transposed at the heat exchanger.

As an alternative, the control device may have for each control sensor at least one alternative control value for a reversed operation, which can be activated during reversed operation. The alternative control value may be activated in this case by a signal, which is, e.g., an electric signal, by means of a vehicle/heater interface, in which case the signal coding may be assigned to a corresponding vehicle model (wire strap, voltage signal) and is therefore independent from the heater.

In a preferred variant of the present invention, the alternative control values are activated automatically by the control device (in a self-learning, self-adapting manner, own logic), especially by the evaluation of the temperature gradient between the control sensors during the operation of the burner.

Consequently, the heater may be used during operation as before. For example, a (first) control sensor, e.g., a temperature sensor, which is positioned in the vicinity of the medium inlet into the heat exchanger (or at the medium outlet from the heat exchanger), may assume the sending of a signal for the on-off control of the heater. Another control sensor, e.g., an overheating temperature sensor, which is positioned in the vicinity of the medium outlet from the heat exchanger, assumes the overheating protection function and the outflow temperature limiting function.

If the reversed operation with opposite direction of flow in the heater-heat exchanger is now to be set up, the connections for the inlet and outlet of the heater in the heat carrier circuit are transposed, in which case the above-mentioned first control sensor (which is now positioned in the vicinity of the medium outlet from the heat exchanger) assumes the outflow limitation function, while the above-mentioned other control sensor (which is now positioned in the vicinity of the medium inlet into the heat exchanger) assumes the overheating protection function and the signal sending function for the on-off control of the heater.

Consequently, mutual flow of the heat exchanger medium is permitted by the present invention in the same heater. Changes and modifications on the hardware of the device are not necessary, as a result of which no additional design effort becomes necessary and the field of application of the device is markedly expanded as well. The possible applications are, in particular, doubled, while the number of given variants of the device remains the same. The advantages of performing the temperature control in the water inlet in the case of devices using water as the medium may be maintained and used with both directions of flow. Flow may be selected in one direction or another in the vehicles, depending on the boundary conditions at the time of planning and design. The article number of the device may be maintained, which leads to advantages in terms of logistics and disposition. The installation and the maintenance of the heater can be simplified and optimized in terms of costs due to the variable connection to the vehicle circuit.

The present invention will be explained in greater detail below on the basis of two exemplary embodiments with reference to the attached drawings, in which:

FIG. 1 shows a vehicle heater, whose principal features are known.

Figure 1:
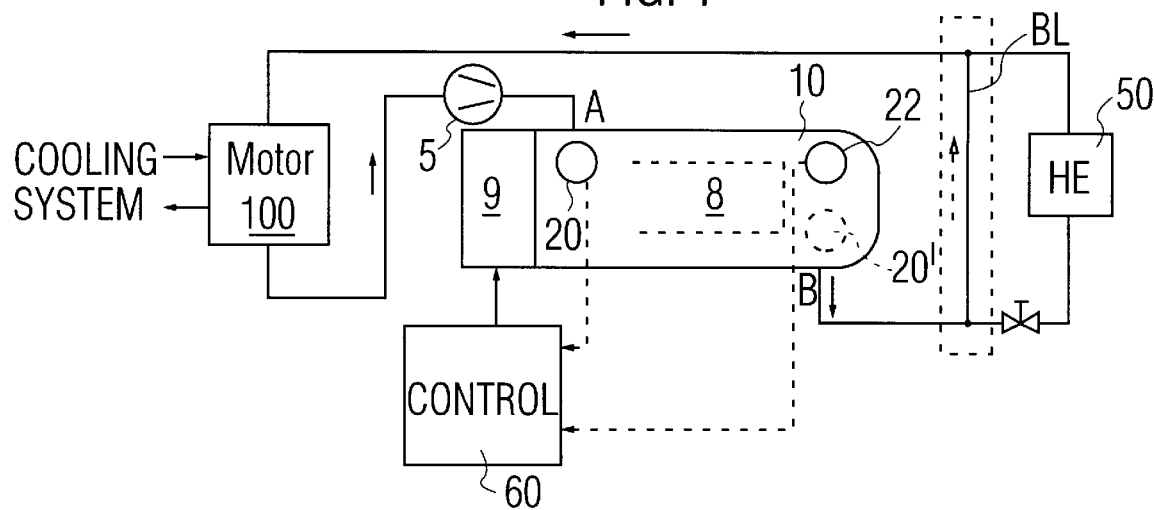
FIG. 1 shows a schematic representation of a vehicle heater in a heat carrier circuit with an upstream internal combustion engine and a downstream vehicle heat exchanger in an application according to the state of the art.

A flame is generated in a combustion chamber joining a burner head 9, for which purpose combustion air is fed to the burner head by a combustion air blower (not shown) and fuel is fed to it via a fuel pump (not shown). The fuel is burned in the burner head 9. The flame propagates to the right in FIG. 1 in the area of a flame tube 8. The flame tube is surrounded by a heat exchanger jacket 10, which is a metallic double-walled housing with an inner gas jacket and an outer water jacket.

Water enters as the heat carrier medium a closed circuit, arriving from the engine 100 of a motor vehicle and flowing, being delivered by a water pump 5, through an inlet connection A into the heat exchanger. Between the inner gas jacket and the outer water jacket, the heater heat exchanger has helical turns, in which the water flowing through the heat exchanger is heated by the hot gases of the flame in the flame tube 8.

The heated water leaves the heat exchanger of the heater through the outlet connection B and reaches from there the heat exchanger (HE) 50 proper of the vehicle for heating the interior space of the vehicle. The water is again returned after the latter heat exchanger 50 into the cooling circuit of the internal combustion engine 100 in order to form a closed circuit in the vehicle heater.

In addition, FIG. 1 shows a bypass line BL, whose purpose is to make possible the circulation of the water through the heat exchanger jacket 10 with the heat exchanger 50 closed.

An inlet-side heat carrier temperature sensor 20 in the form of a water temperature sensor, whose output signal is sent to a control device, is located in the vicinity of the inlet connection A.

Instead of the inlet-side heat carrier temperature sensor 20, it is also possible to provide an outlet-side heat carrier temperature sensor 20', as is known per se.

An overheating temperature sensor 22 is also located at the right-hand end of the heat exchanger jacket 10 or of the flame tube 8. This overheating temperature sensor 22 is designed as the water temperature sensor 20 or 20' used for the control.

The overheating temperature sensor 22 also sends an output signal to the control device. Both output signals, that from the sensor 20 or 20' and that from the sensor 22, are subjected to an analog-digital conversion in the control device and are evaluated by a microprocessor according to defined criteria, as is known in the prior art. The burner is ultimately driven such that the preset upper and lower temperature levels are maintained in the heat exchanger jacket 10, i.e., they are not overshot and undershot. The control sensor 20 or 20' consequently assumes the sending of the signal for the on-off control of the heater. The control sensor 22 assumes the overheating protection and the outflow temperature limitation.

Figure 2:
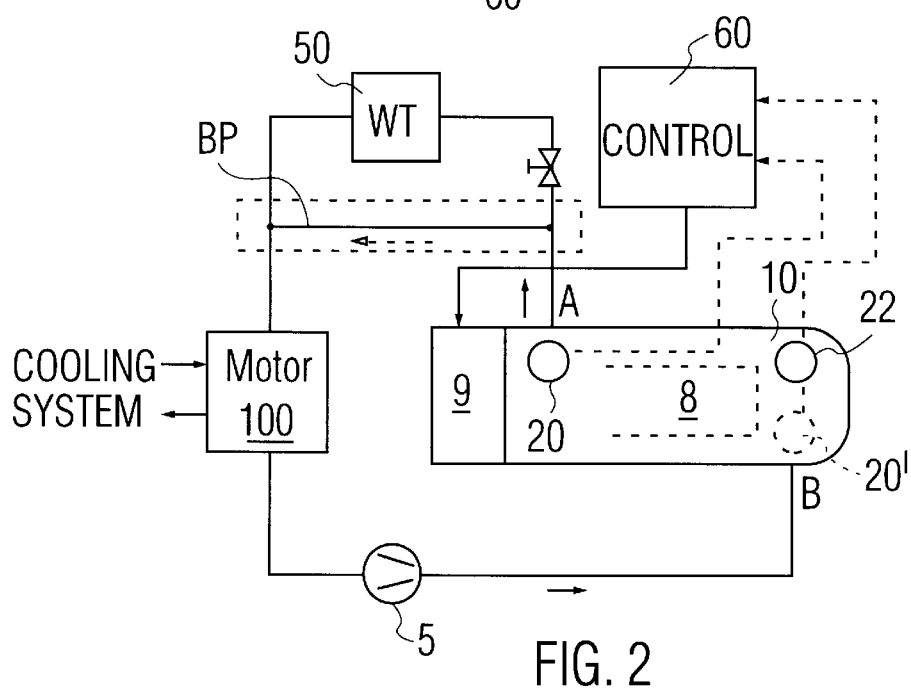
FIG. 2 shows the vehicle heater according to FIG. 1 in an application with reversed direction of flow.

Without changing the hardware, the above-mentioned vehicle heater can now be arranged in the closed heat carrier circuit according to FIG. 2 such that the direction of flow in the heater jacket 10 is reversed compared with the design variant according to FIG. 1. The connection A of the heater heat exchanger now becomes the outlet connection, and the connection B becomes the inlet connection. It is self-explanatory that this leads to different connection lines from and to the engine 100 and from and to the heat exchanger 50. The heat exchanger 50 and the water pump 5 may consequently be arranged in another location in a motor vehicle. The installation and the maintenance of the vehicle heater can be simplified and optimized with respect to costs due to the variable connection A or B to the vehicle circuit. The design boundary conditions in a vehicle can consequently be taken into account better.

As was stated, the hardware of the vehicle heater remains unchanged. This applies, above all, to the control sensors 20 or 20' and 22, which are installed in the heat exchanger system, but are now connected to the control device differently or are associated with other, alternative control values with unchanged connection to the control device in order to establish a satisfactory, predetermined heater and control operation of the vehicle heater. In particular, the control sensor 20 assumes the outflow temperature limitation function, and the control sensor 22 or 20' assumes the overheating protection function and the signal sending function for the on-off control of the heater.

The alternative values stored in the control device can be activated by a signal (e.g., electric signal, by means of the vehicle-heater interface). The signal coding is associated with the corresponding vehicle (wire strap, voltage signal) and is therefore independent from the heater.

It should also be mentioned that independently patentable features contained in the subclaims shall have a corresponding independent protection despite the formal reference to the principal claim. All the inventive features contained in all the application documents also fall within the scope of protection of the present invention.

We claim:

1. An engine-independent vehicle heater, comprising:
    a burner head;
    a flame tube connected to said burner head;
    a heat exchanger jacket surrounding said flame tube;
    a heat carrier medium flowing through said jacket, said heat exchanger jacket having connections for an inlet and an outlet of said heat exchanger medium;
    control sensors connected to a control device for supplying information based on a sensing operation; and
    control means for controlling the operation of the vehicle heater as a function of the heat carrier temperature measured by said control sensors, said control sensors being arranged in the area of said connections, said heat carrier medium flowing through said heat exchanger jacket in either of two directions to provide a forward or a reversed direction as desired, said connections for the inlet and the outlet of the heat carrier medium being transposed in said reversed direction said controller using one of a first control value and a second control value for controlling said the operation of the vehicle heater as a function of the heat carrier temperature measured by said control sensors depending upon whether said heat carrier medium is flowing through said heat exchanger jacket in said forward or in said reversed direction.

2. The vehicle heater in accordance with claim 1, wherein said second control value, as an alternative control value can be activated by a signal.

3. The vehicle heater in accordance with claim 2, wherein said control has a signal coding associated with a corresponding vehicle model.

4. The vehicle heater in accordance with claim 1, wherein said second control value, as an alternative control value is automatically used by said control device.

5. The vehicle heater in accordance with claim 4, wherein said sensor uses one of said first control value or said second control value based on an evaluation of the temperature gradient between the control sensors during the operation of the burner.

6. An engine-independent vehicle heater, comprising:
    a burner head;
    a flame tube connected to said burner head;
    a heat exchanger jacket surrounding said flame tube, said jacket having a first inlet/outlet connection and a second inlet/outlet connection;
    a heat carrier medium flowing through said jacket, said heat exchanger jacket inlet/outlet connections being provided for intake and outflow of said heat exchanger medium;

a first control sensor disposed in said jacket adjacent to said first inlet/outlet connection;

a second control sensor disposed in said jacket adjacent to said second inlet/outlet connection; and control means for controlling the operation of the vehicle heater as a function of the heat carrier temperature measured by said control sensors, said control sensors being arranged in the area of said connections, said heat carrier medium flowing through said heat exchanger jacket in either of two directions to provide a first direction of flow from said first inlet/outlet connection to said second inlet/outlet connection and a second direction of flow from said second inlet/outlet connection to said first inlet/outlet connection as desired, said control means including switch over means for adapting said control sensors depending upon a direction of flow, said switch over means including at least one control value associated with said first direction and one control value associated with said second direction and said switch over means switches said control means between use of said control value associated with said first direction and said control value associated with said second direction.

7. The vehicle heater in accordance with claim 6, wherein said switch over means is activated by an electrical signal.

8. The vehicle heater in accordance with claim 7, wherein said switch over means is activated by a signal coding associated with a corresponding vehicle model.

9. The vehicle heater in accordance with claim 8, wherein said switch over means switches over based on an evaluation of the temperature gradient between the control sensors during the operation of the burner.

10. The vehicle heater in accordance with claim 6, wherein said control means includes an overheating protection means.

11. A method of using an engine-independent vehicle heater, comprising:

providing a burner head;

providing a flame tube connected to said burner head;

providing a heat exchanger jacket surrounding said flame tube, said jacket having a first inlet/outlet connection and a second inlet/outlet connection providing two different possible operational flow directions through said jacket;

selecting one of said two different possible operational flow directions;

providing a heat carrier medium flowing through said jacket, said heat exchanger jacket inlet/outlet connections being provided for intake and outflow of said heat exchanger medium;

providing a first control sensor disposed in said jacket adjacent to said first inlet/outlet connection;

providing a second control sensor disposed in said jacket adjacent to said second inlet/outlet connection; and controlling the operation of the vehicle heater as a function of the heat carrier temperature measured by said control sensors, said control sensors being arranged in the area of said connections, said heat carrier medium flowing through said heat exchanger jacket in either of two directions to provide a direction of flow from either said first inlet/outlet connection to said second inlet/outlet connection or from said second inlet/outlet connection to said first inlet/outlet connection as desired, said control means adapting said control sensors depending upon a direction of flow.

12. The method in accordance with claim 11, wherein adapting said control sensors by said control means includes mutually transposing connections to said control sensors.

13. The vehicle heater in accordance with claim 11, wherein adapting said control sensors by said control means includes control sensors mounted at said heat exchanger mutually transposed.

14. The vehicle heater in accordance with claim 11, further comprising providing the control device for each said control sensor with at least two control values, one for each direction of operation, said control means activating control values depending upon said direction of flow.

* * * * *